3,035,698
REFINEMENT OF ASBESTOS
Izador J. Novak, Trumbull, Conn., assignor to Raybestos-Manhattan, Inc., Passaic, N.J., a corporation of New Jersey
Filed Dec. 19, 1958, Ser. No. 781,585
6 Claims. (Cl. 209—235)

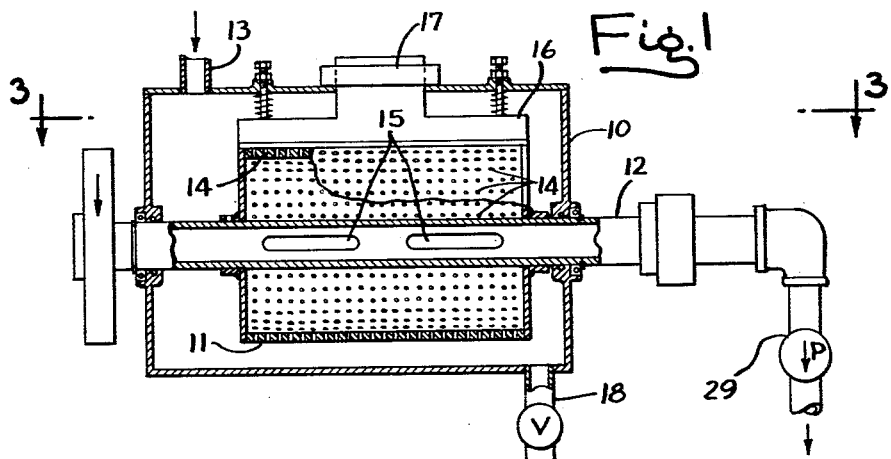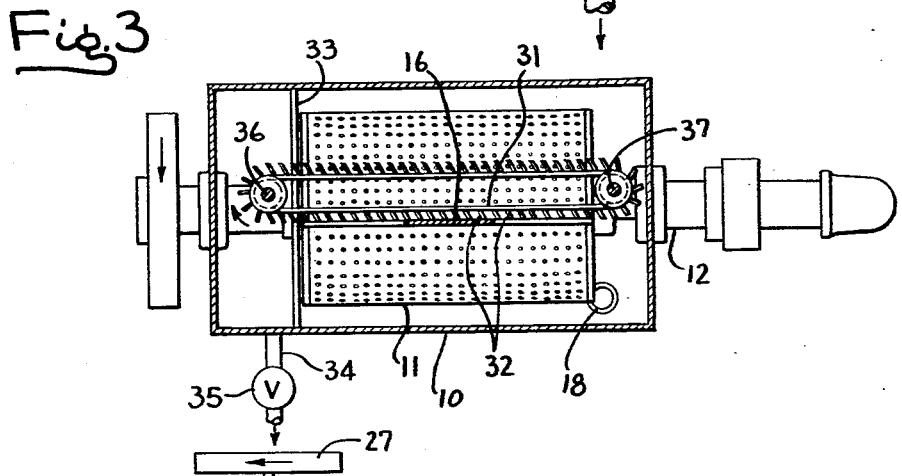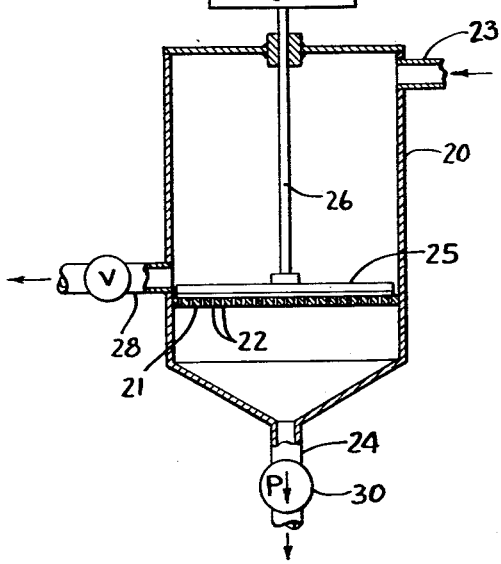

This invention relates to the refinement of asbestos, with the object in view of providing fibrous asbestos of a character which permits it to be sprayed through fine orifices or nozzles such as those of conventional air- or liquid-actuated spray guns, in a steady manner and without clogging the fine orifices thereof, with the end result that the highly refined asbestos provided by the present invention may be used in the aforesaid manner, or otherwise, for a multitude of purposes not hitherto considered feasible with asbestos fibers.

Thus, it is known that asbestos contains associated materials such as serpentine fragments, magnetite inclusions, rock, pieces of wood, altered asbestos which is not amenable to fiberization, unopened asbestos bits of harsh yellow picrolite fiber, and other unopenable oversize bits or bundles of asbestos fiber.

The present invention is particularly concerned with refinement of chrysotile asbestos by removing therefrom residual amounts of the aforesaid impurities, not removable to a like extent by hitherto known processes, and thereby opens up new fields of use for asbestos.

It is also known to partially remove concomitant impurities from asbestos by such methods as vibratory screening, agitation by air blasts to separate heavy particles by gravity, and flotation processes for separating mineral impurities.

I am aware that asbestos in the form of coarse mixtures with binders, such as asphalt, silicate of soda, starches, etc., have been sprayed. However, since the mixtures are coarse, large passages and orifices in the spray equipment are required and the sprayed layer is equally coarse and ununiform. Generally, very little has previously been expected of layers of asbestos sprayed in such fashion. Although the employment of extremely fine asbestos material on the order of dust provides better smoothness and sprayability, in such case the asbestos is practically a nonfibrous filler and the sprayed layer is characterized wholly by the particular binder and lacks the strength provided by fibers.

The present invention teaches refinement of asbestos of fibrous character such as the No. 4 and No. 5 shingle and paper making grades, and including the No. 3 and longer spinning grade lengths of fiber, so as to permit it then to be sprayed by conventional spray gun equipment, whereby, for example, gelatinous slurries of fibrous asbestos can be sprayed as a covering for structural members and wall surfaces; for filling open spaces and rough surfaces; as coating for papers and boards to provide a thin layer of fireproofing material; as a reinforcing and modifying binder for fiberglass insulation bats; and many other uses not heretofore considered practical.

In my Patent 2,626,213 I teach production of collodial dispersions of chrysotile asbestos fibers in an aqueous vehicle containing an organic chrysotile asbestos colloidizing agent, and the production therefrom of products such as paper, after removing associated impurities of the class described at the outset hereof, by passing the asbestos slurry through slotted screen plates such as are used in paper pulp screening, the latter being described in more detail in Patent 2,685,825.

Although the aforesaid cleaning methods are sufficiently good for papers, and although I can employ them herein as a preliminary step, the indicated cleaning methods are not adequate for the production of finely sprayable asbestos, inasmuch as centrifugal cleaning does not remove all material which might clog the fine orifices of conventional spray guns, and attempts at screening through paper-making slotted screens still allow the passage of splints because such slots, which conventionally have a length of 4 inches as compared to a width of from about .010 to about .015 inch, pass wide, flat splints. On the other hand, while a colloid mill might refine the fibers by removing impurities, such practice results in breakdown of fiber length to a degree which seriously reduces the desirable strength of the fibers. In summary, although the forementioned fiber cleaning means were adequate for many purposes, they were inadequate for the production of finely sprayable fibrous asbestos.

I have now found in accordance with the present invention that fibrous asbestos material, which has actual fiber length as distinguished from dust particles, can be refined by straining through a filter medium such as screens having fine openings or holes of small dimension in all directions, the holes being separated by some small multiple of their largest dimension whereby to space them a distance greater than that of the length of the fibers to be refined or cleaned.

The practice to be hereinafter explained in greater detail should be distinguished from the ordinary employment of screens with fibrous asbestos, since ordinary asbestos cannot be filtered through screens but, on the contrary, due to its clotting or matting character has heretofore been employed as a filter aid by disposing such asbestos over a wire mesh screen, as for example in a filter press. Further, as is well known in paper-making processes, even when employing asbestos fibers, felting is in part accomplished by the opposite ends of a fiber going into two different holes of the paper making screen, whereby they become draped or felted on the screen between two openings and thereby are retained on the screen with relatively few of the fibers going through with the white water.

As a characterizing feature of the present invention, I employ perforated metal or ceramic plates in suitable containers wherein the distance between the openings or perforations is generally greater than the length of the asbestos fibers and wherein said openings are also smaller in transverse direction than the length of the fibers, as a result of which the fibers do not become draped over intermediate portions: that is, one end in one hole and the other end in an adjacent hole, but rather pass lengthwise, that is, endwise or hairpinwise through a single hole and leave behind particles which cannot pass through the small holes of the plate or screen.

As a process aid, the fibers subjected to treatment of filtering or straining in the perforated screens of the present invention should be of a nonclotted character and in the condition of colloidal dispersions as hereinbefore specified. Such fibers are further characterized by their lubricated nature due to their jelly-like water-holding characteristics, and these fibers tend to go with the liquid to the fine openings in the screen rather than settling out on the filter in the form of a clotted mat. Furthermore, this lubricated character of the asbestos fibers allows the slurry to move freely through small openings or holes herein contemplated because clot formation does not develop. The resultant slurry, having passed through these fine orifices, which are smaller than any passages in conventional fine spraying guns, cannot therefore clog these spray gun passages. By reason of the foregoing, slurries of high consistency, say up to about 10% by weight, may be screened and suitably sprayed in such concentration to leave thick and dense deposits, or at suitably low concentration, say ½–2%, may be sprayed as a fog or mist to produce thin tissue-like asbestos deposits.

By the employment of screens having holes of small size, in accordance with the practice of the present invention, there is a limited passage to splints in all directions and to the diameter or longest dimension of the holes. Further, although the splints might, for example, go through a circular hole having a diameter of 0.20 inch, they would have to be almost parallel to the axis of the hole to go through, and this is unlikely from which it will be obvious that the employment of a screen with holes of the indicated size can readily filter out nonfibrous materials appreciably smaller than the hole size and, of course, nothing goes through the holes of the screen which has a transverse dimension larger than the largest dimension of the holes. It will be understood that the openings of the screens employed herein and generically designated as "holes" may be of various shapes, such as circular, oval, semicircular, triangular trapezoidal, rectangular, etc., and wherein the longest dimension is not more than about three times the shortest.

Although the process of my aforesaid Patent 2,626,213 produces dispersions of asbestos fibers where the majority of fibers are of colloidal diameter and of ultimate fiber size, there remain some groupings or bundles of fibers which are at times less amenable to subdivision without added agitation, and the present invention provides a means for accomplishing such further subdivision and reduction of a body of treated asbestos to a more uniform character by passing it through the perforated screen of the present invention. If desired, a series of screens of progressively finer openings in a plurality of steps can be employed to provide slurries of asbestos fiber of extreme smoothness where desirable. Such refining does not always require the passage of plates of successively smaller perforations, but may even be accomplished by repeated passage through the same openings.

The accompanying drawings diagrammatically illustrate apparatus for straining asbestos in accordance with the present invention.

FIG. 1 of the drawings illustrates a horizontally disposed receptacle and rotating filter medium.

FIG. 2 illustrates a vertically disposed receptacle having a fixed horizontally extending filter medium.

FIG. 3 is a section as on the line 3—3 of FIG. 1, showing a modification thereof.

Referring to the drawings, FIG. 1 shows a horizontally extending receptacle 10 having disposed therein a cylindrical endwise closed perforated screen 11 rotatably mounted on the tubular conduit 12. The asbestos to be strained is admitted to the receptacle 10 through the conduit 13 and passes by means of suction provided by the pump 29 through the circular openings 14 of screen 11 to the interior of the cylinder 11 and outwardly therefrom through the slots 15 in conduit 12 wherefrom it is discharged.

As an aid to keeping the screen 11 clean and for removing the accumulated splints and other non-passed particles, a blade 16, substantially coextensive with the length of the cylinder screen 11, is adjustably secured by means extending through the receptacle 10, as at 17, whereby the cylinder screen 11 may be cleaned either intermittently or continuously during its rotation, and for this purpose the blade may run almost in contact with the surface of the cylinder. For the purpose of aiding influshing and discharging collected impurities from the receptacle 10, a discharge conduit 18 may be intermittently employed.

Continuous removal and segregation of the oversize material scraped from screen 11 by blade 16 is illustrated in FIG. 3. Here an endless belt 31 having a plurality of scoops 32 moves across the face of blade 16 and discharges the removed material into receptacle 33. The collected material may be continuously or intermittently drained from receptacle 33 through line 34 and valve 35. In this arrangement the scraper 16 is placed just beyond the vertical center line of screen 11, and the belt 31 trained around the pulleys 36 and 37, the pulley 37 being driven from means (as a motor not shown) disposed outwardly of receptacle 10. The accumulated rejected material may be returned to the supply for mixing with fresh fiber and for recovery of any good fiber trapped with the refuse, and this recycling may be continuous.

The device in FIG. 2 comprises a vertically extending receptacle 20 having disposed transversely thereof the screen plate 21 provided with small circular openings 22. The asbestos to be refined is admitted through the orifice 23 and discharged after passing through the screen 21 through an orifice 24. Here again the filtering may be aided by means of, for example, the suction pump 30.

For the purpose of either intermittently or continuously cleaning the slotted screen plate 21, there is provided a scraper blade 25 carried on the rotatable shaft 26 extending through the top of the chamber 20 adapted for rotation by means of the pulley 27. A lateral conduit 28 is provided for discharge of accumulated large particles and at intermittent cleaning periods. In the alternative, back-pressure may be used to remove material in and above the screen holes, and flushed with water in the reverse direction, i.e., from the bottom up.

The size of the holes 14 or 22 in the respective perforated screens 11 and 21 should be of the general diameter and spacing hereinbefore specified, and generally proportional to the length of the asbestos fibers to be refined. Thus, for example, holes on the order of from about 0.001 to about 0.040 inch in diameter, with spacings on the order of 0.05 to 0.2 inch between the edges of the adjacent openings, have been found suitable. Since the diameter of the unit asbestos fibers in colloidal dispersion is so small—about $\frac{1}{50}$ micron—the lower limit of hole size is actually a matter of availability and mechanical skill in providing a suitable firm plate with adequate spacing between holes. For example, a hole .001 inch in diameter allows these fibers to pass through freely since it is more than 1000 times the diameter of the unit asbestos fiber. Plates with .001 inch holes may be produced by electroforming. The 0.05-inch spacings have been found adequate to handle the No. 4 and No. 5 grades of fibers with a minimum of lockage and separation of good fiber from splints and from tangled refuse. With further separation of the openings there is less locking of fibers, and the spacing up to 0.2 inch will handle the longer spinning grades such as No. 3 spinning grades.

Because it is difficult if not impossible to obtain an accurate estimate of the actual length of the fibers in a colloidal dispersion, the best criterion of spacing, for any given fiber, is freedom from immediate lockage or sheet formation, which renders the method inoperable, even with a scraper. If this occurs, wider spacing of the holes is the remedy, and the spacing must be increased until the locking no longer occurs, and the straining, with adequate removal of the rejected material, goes on in continuous fashion. The whole question of selection of hole diameter and spacing, of course, is related to open area for slurry passage, which governs the strained volume rate. Therefore, for any given purpose and material, the holes will be only small enough for adequate cleaning, and spaced apart only sufficiently to avoid fiber locking, to get the largest throughput.

The grades of fibers heretofore mentioned are those which are standard in accordance with Canadian chrysotile asbestos classification, where group No. 3 are designated as textile and spinning fibers; No. 4 shingle fibers; and No. 5 paper fibers. As is known, these groupings embrace fibers of varying lengths within limits determined by screening of milled dry fibers where, for example, in No. 3D grade, eight ounces of fibers are retained on a vibrated screen of half-inch openings; six ounces on a second screen of 1.87-inch openings; one ounce on the third screen of .053-inch openings; and one ounce passes through the latter screen. In No. 4D fibers none are retained on the half-inch screen; five ounces are retained on the No. 2 screen; ten ounces are retained on the No. 3 screen; and one ounce passes through the latter screen. In No. 5D fibers none are retained on the half-inch screen; half ounce are retained on the No. 2 screen; ten and one-half ounces are retained on the No. 3 screen; and five ounces pass therethrough. It will also be understood, of course, that of the fibers retained on any one screen the length varies and the fibers are of a tangled, clotted character, making sharp determination of length impractical.

To place the asbestos fibers in condition for straining in accordance with the present invention, the slurry is first prepared in accordance with the teachings of my Patent No. 2,626,213 by, for example, mixing 3R milled asbestos fiber at a 5% concentration by weight in a solution of water containing a proportion of colloidizing agent to form a colloidal dispersion, such as 10% by weight based on the fibers of Aerosol O.T. (dioctyl sodium sulfosuccinate), or larger proportions of ammonium oleate, sodium aryl alkyl sulphonate, etc. This results in a 5% slurry or colloidal dispersion of chrysotile asbestos fibers in the aqueous vehicle which contains the aforesaid organic chrysotile asbestos colloidizing agent.

On the other hand, this slurry may be made in more dilute condition, as in concentrations of ¼% to 1%, followed by dehydration to desired consistency after refining.

After subjecting the foregoing slurry to straining in the devices and manner hereinbefore described, it has such refined character, particularly when made with Aerosol O.T. as the dispersing agent, that it is compatible with various desirable binders, such as water soluble phenolic resins, sodium silicate, drying oil or synthetic resin emulsions, either natural or synthetic rubber latices, and the like bonding and modifying agents. The resulting smooth, viscous flow character of these slurries makes them highly adaptable for various insulating, filling, sound-deadening sprayed-on coatings, or reinforcing bonding agents when sprayed onto other materials, and for various other uses. It may also be dried, as by spray-drying, drum-drying, or otherwise, to produce asbestos fiber of a new order of fineness and cleanliness for any of its present uses, as well as new uses available through its improved properties. The organic content may be removed, if desired, by a short high temperature heat cleaning, say two hours at 700° F., or by extraction with suitable solvent, such as alcohol, acetone, alkaline water, followed by drying.

Although I have particularly referred to the adaptability of my herein refined asbestos for use either alone or with binders and other adjuvants, in air- or liquid-actuated spray guns, it may be employed solely with liquid pressure as in simple garden-hose type nozzles. It will also be understood that the fine, highly refined asbestos herein provided can be used in various manners due to it ultra-refined character, for example, for extruding in shapes of desired cross-section which will have very uniform strength, for the production of sheets, for the coating of woven or other fabric, and many other uses which will be apparent to those skilled in the art.

I claim:

1. The method of refining asbestos which comprises straining a colloidal dispersion of chrysotile asbestos fibers in a liquid vehicle containing organic chrysotile asbestos colloidizing agent, through a filter surface formed with holes wherein the defining edges of adjacent holes are spaced a distance greater than that of the length of the fibers in said dispersion, said holes being of dimensions to prevent passage of undesirable oversize material contained in said liquid vehicle, and continuously scraping said filter medium to keep its holes free of retained oversize particles.

2. The method of refining asbestos which comprises straining a colloidal dispersion of chrysotile asbestos fibers in a liquid vehicle containing organic chrysotile asbestos colloidizing agent, through a filter surface formed with circular holes wherein the defining edges of adjacent holes are spaced a distance greater than that of the length of the fibers in said dispersion, said holes being of a diameter of from about 0.001 to about 0.040 inch to prevent passage of oversize undesirable particle material contained in said liquid, the adjacent edges of said holes being spaced from each other a distance of from about 0.05 to about 0.20 inch.

3. The method of refining asbestos which comprises straining a colloidal dispersion of chrysotile asbestos fibers in a liquid vehicle containing organic chrysotile asbestos colloidizing agent and incompletely opened groups of asbestos fibers, through a filter surface formed with holes wherein the defining edges of adjacent holes are spaced a distance greater than that of the length of the fibers in said dispersion, said screen holes being of a diameter to prevent passage of undesirable oversize material contained in said liquid vehicle, and recirculating resulting residue through said filter medium to aid opening and passage of fibers from said incompletely opened groups.

4. The method of refining asbestos which comprises straining a colloidal dispersion of chrysotile asbestos fibers in a liquid vehicle containing organic chrysotile asbestos colloidizing agent and incompletely opened groups of asbestos fibers, through a filter surface formed with holes wherein the defining edges of adjacent holes are spaced a distance greater than that of the length of the fibers in said dispersion, said holes being of a diameter to prevent passage of undesirable oversize material contained in said liquid vehicle, and passing resulting filtrate through a filter medium of relatively smaller holes than the former to aid opening and passage of fibers from said incompletely opened groups.

5. The method of refining asbestos which comprises straining a colloidal dispersion of chrysotile asbestos fibers in a liquid vehicle containing organic chrysotile asbestos colloidizing agent, through a cylindrical filter formed with holes wherein the defining edges of adjacent holes are spaced a distance greater than that of the length of the fibers in said dispersion, said holes being of dimensions to prevent passage of undesirable oversize material contained in said liquid vehicle.

6. The method of straining asbestos fiber in colloidally dispersed form to free it from oversize particles, which comprises passing the fiber lengthwise through a filter surface formed with holes wherein the defining edges of adjacent holes are spaced a distance greater than that of the length of the fiber in said dispersion, the holes being smaller in the greatest diameter than the length of said fiber.

References Cited in the file of this patent

UNITED STATES PATENTS 2,685,825     Kovac _____ Aug. 10, 1954
2,826,126     Cowles _____ Mar. 11, 1958